April 10, 1945.   J. REHNER, JR   2,373,599
TIRE TREAD
Filed Aug. 29, 1941
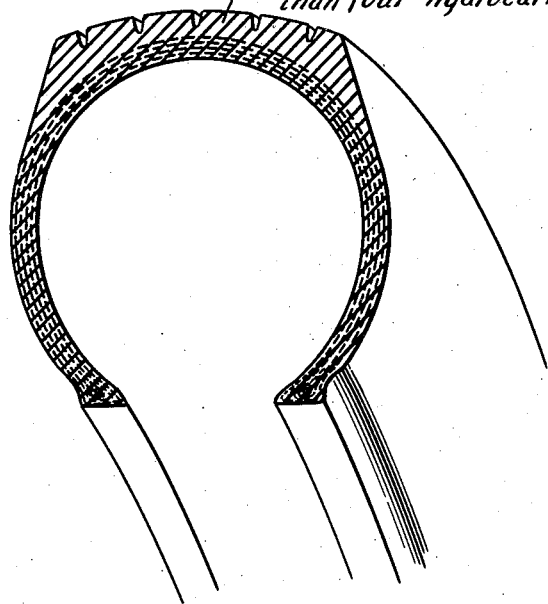
Tire tread comprising rubber compounded with a minor proportion of a polycyclic aromatic hydrocarbon containing not more than four hydrocarbon rings.
Inventor
John Rehner Jr.
By Willis F. Avery
Atty.

Patented Apr. 10, 1945

2,373,599

UNITED STATES PATENT OFFICE 2,373,599

TIRE TREAD

John Rehner, Jr., Wadsworth, Ohio, assignor to The B. F. Goodrich Company, New York, N. Y., a corporation of New York Application August 29, 1941, Serial No. 408,841

5 Claims. (Cl. 152—374)

This invention relates to rubber compositions adapted for use in tire treads and for similar purposes where the rubber is subjected to repeated rapid flexures under high compressive loads. The invention aims particularly to reduce the heat build up in the rubber which ordinarily occurs under such conditions.

The accompanying drawing illustrates a tire embodying the present invention.

When rubber tires are in service they tend to develop somewhat high temperatures, particularly in the treads, because of the constant and rapid flexing of the tire as it runs across the ground. If there are many jolts and jars encountered, the temperatures developed are much higher than when the tire runs across a smooth surface such as a pavement. This heat tends to weaken the tire and shorten its term of useful service. I have discovered a method of making tire treads and the like wherein the resulting tread runs much cooler and the life of the tire is increased materially. In making these improved treads an ordinary tire tread composition is provided and into this composition is incorporated, as by milling, a minor proportion of a polycyclic aromatic hydrocarbon containing not more than four hydrocarbon rings. A list of these hydrocarbons includes such preferred compounds as naphthalene, anthracene, phenanthrene, acenaphthene, acenaphthylene, and similar compounds. Better results will be obtained if the polycyclic compounds are unsubstituted by any elements or radicals although beneficial results may still be obtained if substituents having small atomic weights are present. However, it may be said that for best results the aromatic polycyclic hydrocarbons should be used unsubstituted.

In practicing my invention from 0.25% to 4.0% by weight of a polycyclic hydrocarbon is added to a usual unvulcanized tread rubber composition as an additional compounding ingredient or the hydrocarbon may be used as a partial or entire replacement for one or more of the softeners such as pine tar oil that are ordinarily added during the mixing of the composition. In one embodiment of the invention an ordinary unvulcanized tire tread composition is provided containing the usual softeners, vulcanizing agents, accelerators, anti-oxidants, and reinforcing pigments and to this stock is added 2% of anthracene by weight of the composition. The prepared composition is applied to a conventional tire carcass as a tread in the usual manner and the assembled tire is vulcanized in the customary mold. The resulting tire will then be found to run several degrees cooler than an equivalent tire containing no anthracene in the tread. This is particularly important in heavy duty tires where temperature is a very important factor affecting the life of the tire.

Having disclosed my invention together with a list of preferred organic compounds for use therein, may it be understood that it is not my intention to limit the invention to these preferred compounds but that excellent results may be obtained by the use of other members of the same class of chemicals. It is my desire to protect the invention broadly within the spirit and scope of the appended claims.

I claim:

1. A tire having a tread portion exhibiting improved resistance to heat build up caused by repeated flexures, said tread portion comprising a vulcanized rubber composition containing from 0.25% to 4.0%, by weight, of a polycyclic aromatic hydrocarbon containing not more than four hydrocarbon rings.

2. A tire having a tread portion exhibiting improved resistance to heat build up caused by repeated flexures, said tread portion comprising a vulcanized rubber composition containing from 0.25% to 4.0%, by weight, of an unsubstituted polycyclic aromatic hydrocarbon containing not more than three hydrocarbon rings of which all are condensed rings.

3. A tire having a tread portion exhibiting improved resistance to heat build up caused by repeated flexures, said tread portion comprising a vulcanized rubber composition containing from 0.25% to 4.0%, by weight, of anthracene.

4. A tire having a tread portion exhibiting improved resistance to heat build up caused by repeated flexures, said tread portion comprising a vulcanized rubber composition containing from 0.25% to 4.0%, by weight, of phenanthrene.

5. A tire having a tread portion exhibiting improved resistance to heat build up caused by repeated flexures, said tread portion comprising a vulcanized rubber composition containing from 0.25% to 4.0%, by weight, of acenaphthene.

JOHN REHNER, JR.